Figure 1:
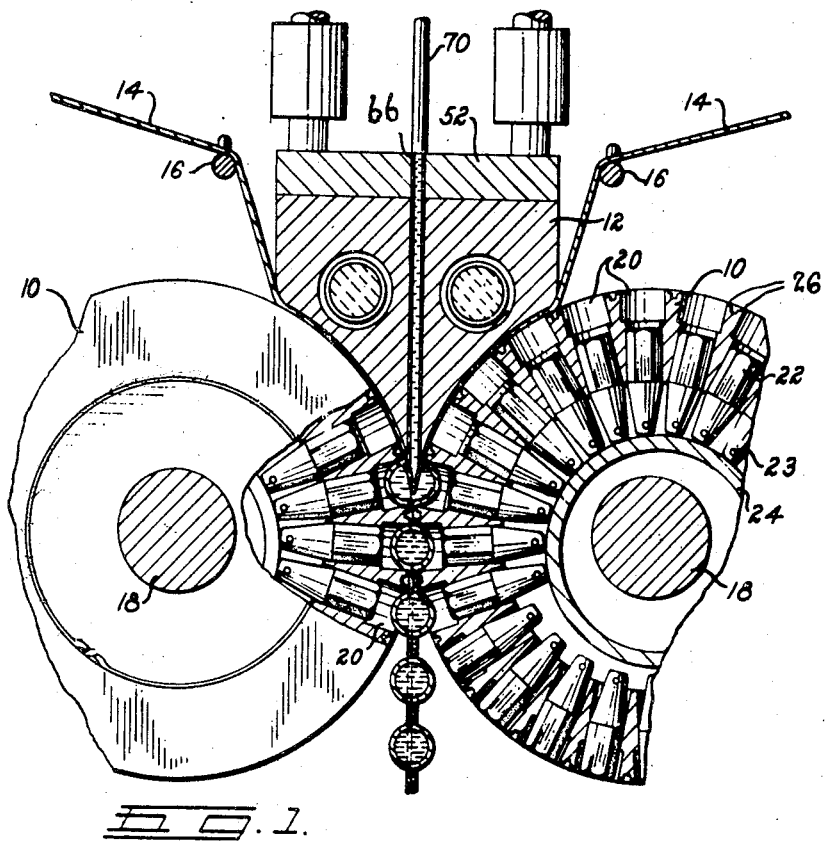

Jan. 23, 1945. R. P. SCHERER 2,367,802
FEEDER HEAD
Original Filed Dec. 26, 1941 2 Sheets-Sheet 1

Inventor
ROBERT P. SCHERER
By Parker & Burton
Attorneys

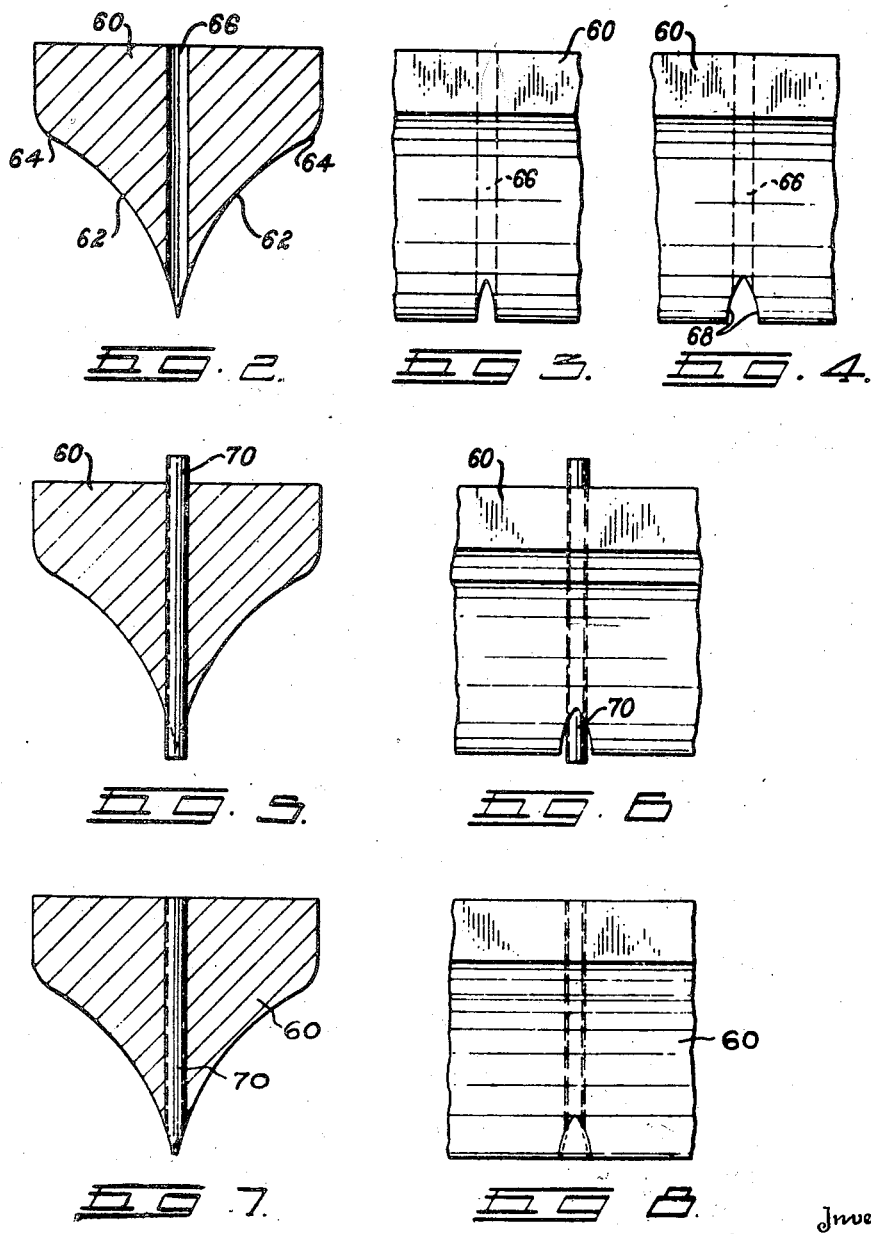

Patented Jan. 23, 1945

2,367,802

UNITED STATES PATENT OFFICE 2,367,802

FEEDER HEAD

Robert P. Scherer, Detroit, Mich., assignor, by mesne assignments, to Gelatin Products Corporation, Detroit, Mich., a corporation of Michigan Original application December 26, 1941, Serial No. 424,479. Divided and this application October 13, 1943, Serial No. 506,081

5 Claims. (Cl. 18—21)

This invention relates to improvements in a feeder head and particularly to a feeder head adapted to deliver content material in a capsule forming and filling machine. This application is a division of my copending application, Serial No. 424,479, filed December 26, 1941, now Patent No. 2,362,410.

The object is to provide an improved feeder head that is so constructed as to deliver successive increments of content material between two sheets of capsule forming material in such a manner and at such points that the successive increments are successively capsulated without loss of content material or admission of air into the capsule. The delivery takes place at what will be approximately the center of the capsule shell. This improved feeder head is of a novel construction designed to accomplish this result.

The construction is such as to exhibit two outwardly concave outer faces which converge to a relatively narrow edge and through which edge opens, at spaced points therealong, a plurality of content material discharge passageways. Each discharge passageway opens through said edge in the form of a narrow slit which extends linearly of the edge. Each discharge passageway terminates at the edge of the head in a pair of thin wall portions which conform generally with the contour of the two converging concave faces of the head. Such thin wall portions are formed by a thin walled tube which is mounted within and extends through a passageway formed in the feeder head.

This tube constitutes the discharge passageway proper. The tube is so shaped at the edge of the feeder head as to exhibit a discharge opening which extends linearly of such edge and which is of relatively narrow width transversely of the edge. The size of the opening is such as to exert a capillary action upon the fluid passed therethrough and the thin wall portions are sufficiently flexible to be spread apart by the pressure of ejection of content material delivered through the tube and to close toward each other when such ejection pressure is reduced.

Various other objects, advantages and meritorious features of this invention will become more fully apparent from the following specification, appended claims and accompanying drawings, wherein:

Fig. 1 is a sectional view through the feeder head and associated die members of the machine showing the manner of delivering capsule content material in the forming of the capsules, Figs. 2 and 3 are cross-sectional and side views, respectively, of the feeder head showing the first step in the formation of the delivery passage, Fig. 4 is a view similar to Fig. 3 but after the opening of the passage at the edge of the feeder head has been enlarged.

Figs. 5 and 6 are cross-sectional and side views, respectively, of the feeder head after the delivery tube has been inserted, and Figs. 7 and 8 are cross-sectional and side views, respectively, of the feeder head after the end portion of the delivery tube at the edge of the feeder head has been compressed to form a narrow discharge slit.

Referring in detail to the drawings, I have shown in Fig. 1 two die members 10—10 of the roll type provided on their faces with a plurality of die cavities or pockets in which the capsules are formed, filled, sealed and severed. Superimposing these die rolls is a feeder head 12 having converging side faces tapering to a thin edge or apex which enters between the die rolls as shown. This arrangement in general is similar to that illustrated in my Patent No. 2,288,327, dated June 30, 1942, but differs therefrom as will be more particularly pointed out hereinafter.

Two bands or ribbons 14—14 of capsule forming material, such as a gelatinous plastic substance, are fed between the die rolls. The two bands are delivered from opposite sides of the machine and directed over guides 16—16 mounted above the die rolls. From thence the bands pass between the converging side walls of the feeder head and the die rolls and thence between the die rolls and on out to the other side. The converging sides of the feeder head have a concave curvature conforming in general to the curved faces of the die rolls but specifically there is a slight variation in these two curved elements for the purpose of obtaining a better seal as more particularly pointed out in my Patent No. 2,318,718, dated May 11, 1943.

Each die roll is mounted on a shaft 18. Each die roll is provided with a plurality of die cavities or pockets 20 which correspond in number, shape and position on the two die rolls. The die rolls are mounted on their respective driving shafts so that when rotated in opposite directions at the same speed the cavities 20 on one die roll align themselves opposite a cavity in the other roll when they pass through the plane intersecting the axes of the rolls.

In each cavity a plunger 22 is disposed which is free to reciprocate longitudinally therein as it is urged by gravity. Each row of plungers is parallel to the axis of the die roll. The several plungers on each row are connected together for joint reciprocal movement by a pin 23 extending through the inner ends of the plungers. Within each die roll is a sleeve 24 having a limited radial play. Each sleeve 24 acts as a cam in its respective die roll and urges all the plungers 22 outwardly as they swing below the center of the die roll to insure clearance of the capsule cavity.

The die cavities or pockets 20 are spatially arranged in such a way upon the die rolls and so provided with surrounding ledges and intermediate elevations 21 that the maximum number of accurately formed and properly sealed capsules are produced. There is also a minimum wastage of content material within the net as described more fully in my Patent No. 2,318,718, dated May 11, 1943.

As heretofore stated, this invention relates to the feeder head per se. The feeder head 12 is constructed in a novel way to inject fluid filler substances directly through the apex of the feeder head into the heart of the capsule as it is formed, as shown in Fig. 1. Referring to Fig. 1, the feeder head block 12 is drilled or otherwise formed with one or more passages 66 extending from the top side and opening out through the common edge of the converging arcuate faces. Each passageway opens out through the opposite arcuate faces of the feeder head adjacent to its point of opening through the edge of the feeder head.

In each passage 66 a tube 70 is mounted. The lower end of each tube is swaged to form a narrow slit-like opening extending linearly of said edge which edge constitutes the apex of the feeder head. Prior to the insertion of the tube the end of the opening through the edge of the head has been widened as shown in Figs. 4 and 6.

The opposite ends of the tubes project above the feeder head and through a supporting block 52 to which the feeder head is attached. The tubes are flexible in their extension away from the feeder head to permit free flotation. The block 52 and the feeder head 12 are mounted for limited universal movement so that the feeder head floats on the converging portions of the bands 14—14 supported upon the die rolls 10, shifting up or down or to the side and even turning or tilting slightly to adjust itself to any irregularity in band thickness. This feature is described and claimed in my Patent No. 2,208,327, dated June 30, 1942.

The feeder head is formed in a novel manner. The novel construction of the feeder head can probably be best explained by a description of its method of manufacture as illustrated. An elongated metal block 60 is first shaped by undercutting to provide opposite, arcuate, outwardly concave, outer faces 62—62 converging to a common edge or apex as shown. Rounded shoulders 64—64 are formed at the point where the concave faces meet the original sides of the block. The feeder head block is then drilled with one or more passages 66 from the top side through to the common edge or apex. The mouths of the passages opening through the apex of the block open out through the oposite concave faces as shown in Fig. 3. These mouths are now widened in the manner shown at 68 in Fig. 4 to increase their dimensions linearly of the edge. Figs. 2 to 4 show the condition of the block after these operations.

Tubes of readily deformable thin walled material are inserted in the passages 66. One such tube is shown at 70 in Fig. 5. Preferably only a small portion of the tube projects beyond the apex as indicated in Figs. 5 and 6. A small thin shim is then placed in the apex end of each tube and arranged so that it extends in the direction of the apex. The tubes are now crimped down until the side walls of each tube at the widened mouth of the passage 66 assumes the curvature of the side walls 62—62. At the same time the side walls of the tube at this point spread laterally to fill the wide mouth of the passage as indicated in Fig. 8. The shim prevents the walls of the tube from entirely collapsing upon one another so that there is left, upon removal of the shim, a slight clearance in the form of a narrow slit discharge opening between the flattened sides of the tube. When properly formed, this slit is in alignment with the edge or apex and extends substantially the width of the mouth of the passage. If the tube, following flattening, projects beyond the edge of the head, it may be trimmed to extend in alignment therewith.

The tube is flattened to substantially a knife edge opening linearly along the edge of the feeder head. For example, a ⅛" tube might be flattened to produce an opening transversely the edge of the feeder head of .010". The opening formed is of such size that it exerts a capillary action on the liquid content material fed through the tube tending to hold the discharge opening full and to prevent wiping of content substance off by the gelatin bands advancing over the head.

The swaging of the tube which produces the flattening thins out the tube wall so that there is a tendency for the tube at its flattened end to breathe, opening for discharge under the ejection impulse and closing under pressure of the gelatin bands between impulses. In use, filler substances are fed down the tubes 70 and out through the narrow slits in the bottom ends thereof. The filler substances are preferably urged through the tubes under intermittent pressure operating in timed relationship to the rotation of the die rolls and the position of the die cavities thereon.

What I claim is:

1. A feeder head having outwardly concave side faces converging to a common edge and having a discharge passageway extending through said head, said passageway having a slit like outlet through said edge and extending linearly thereof and which outlet has a dimension linearly of the edge many times greater than its dimension transversely thereof, said outlet being defined on opposite sides of said head by relatively thin flexible wall portions extending substantially flush with the adjacent portions of the concave surfaces of the head.

2. A feeder head having outwardly concave side faces converging to a common edge and having a discharge passageway extending through said head, said passageway having an outlet through said edge which outlet has a dimension linearly of the edge greater than its dimension transversely thereof, said outlet being defined on opposite sides of said head by relatively thin wall portions extending substantially flush with the adjacent portions of the concave surfaces of the head, said wall portions being sufficiently flexible to spread apart under pressure of the content material being ejected to facilitate discharge thereof.

3. A feeder head having outwardly concave converging side surfaces terminating in a common edge and provided interiorly with a passageway opening out through said edge, said passageway having a mouth portion at said edge of greater dimension linearly of the edge than transversely thereof and opening out through said side surfaces adjacent to said edge, and an open ended tube mounted in said passageway having one end terminating substantially flush with said edge, said end being flattened within said mouth portion of the passageway and shaped to form a slit extending in line with the edge and having its outer flattened sides extending substantially flush with the contour of the concave side surfaces of the head.

4. A feeder head comprising, in combination a block having outwardly concave oppositely disposed side surfaces converging to a common edge, said block provided with a passageway extending therethrough and having an outlet through said edge opening out through said side surfaces adjacent to said edge, said outlet having a greater dimension lengthwise of the edge than transversely of the edge, an open ended feeder tube disposed within said passageway with one end of the tube terminating within said outlet substantially flush with said edge, the end of the tube within said outlet being flattened to fill said outlet flush with the concave side surfaces of the block, the opposed flattened sides of the tube within said outlet being spaced apart providing a narrow slit discharge substantially in line with the edge and of a size to exert capillary action on fluid therein.

5. A feeder head having oppositely disposed outwardly concave side surfaces converging to a common edge, a feed passageway through the head terminating in an outlet through said edge opening out through said side surfaces adjacent to said edge, said outlet having a greater dimension lengthwise of the edge than transversely thereof, a tube fitted within and extending through said passageway having an open end terminating within the outlet of the passageway substantially flush with said edge, the end of the tube within the outlet being flattened filling said outlet lengthwise of the edge and having opposed outer flattened surfaces lying flush with the outer surfaces of the head, the opposite flattened sides of the tube being spaced apart transversely of the edge providing an opening in the form of a slit extending lengthwise of the edge, said tube having a wall sufficiently thin and flexible at the discharge end within said outlet whereby the flattened sides spread apart under content ejection pressure and tend to close toward each other under compression pressure against opposite sides.

ROBERT P. SCHERER.